UNITED STATES PATENT OFFICE.

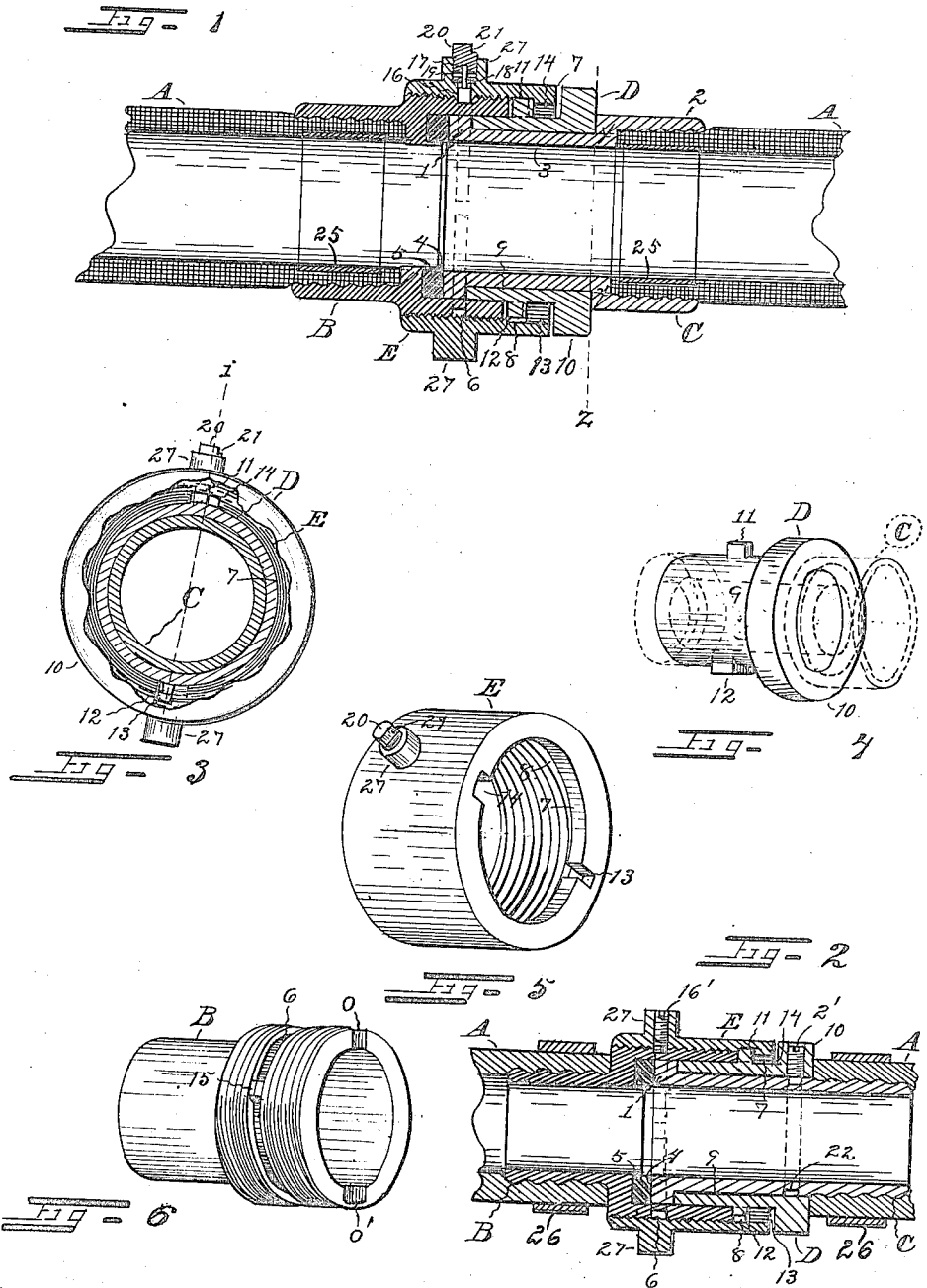

EDWARD G. THOMPSON, OF BATTLE CREEK, MICHIGAN.

HOSE-COUPLING.

1,254,375.

Specification of Letters Patent.   Patented Jan. 22, 1918.

Application filed February 26, 1917.   Serial No. 150,878.

*To all whom it may concern:*

Be it known that I, EDWARD G. THOMPSON, a citizen of the United States, residing at Battle Creek, in the county of Calhoun and State of Michigan, have invented certain new and useful Improvements in Hose-Couplings, of which the following is a specification.

The present invention relates to hose couplings in which the hose attaching sections are retained in alinement through the telescoping of an enlarged portion of the one with the other section, and between a shoulder of the enlarged section and the coupling end of the other section an annular bushing is fitted, the parts being held in locked contact by means of a connecting collar having oppositely-disposed differing sized lugs fitted to one of said sections, the lugs of said collar registering through correspondingly-formed slots in a depending flange of a limited, screw-threaded locking collar on the other of said sections and fitting into correspondingly-formed gains in the end of said screw-threaded section and held therein by the flange of the screw-threaded collar as it is turned on its bearing.

Among other objects, the invention contemplates means whereby abutting hose sections may be more firmly secured than has been customary with devices of similar construction; whereby inconvenience in turning the hose to operate the coupling of the hose sections will be obviated; whereby the threaded parts of the coupling will be rendered less liable to become loosened through means of a friction stop for the purpose. A further object of the invention is to generally improve and increase the efficiency of the several coacting elements in a hose coupling which consists in certain novel features and arrangements of parts, as will be hereinafter more particularly set forth, shown in the drawings and embodied in the appended claims.

In the drawings forming a part of this specification, Figure 1 is a longitudinal vertical section of an embodiment of the invention, the coupling sections being shown with the interlocking lugs of the collar of one section mismatched with the slots of the collar of the other section through which they are inserted, the collar of one section being turned a half revolution in respect to the other.

Fig. 2 is a modification in like arrangement.

Fig. 3 is a broken end view looking to the left from the dotted line *z*, the relative position of the figures being designated by the line *i—i*.

Fig. 4 is a perspective view of the rotative connecting collar, a skeleton figure in dotted outline showing the hose-attaching section C to which it is fitted.

Fig. 5 is a perspective view of the limited internally screw-threaded locking collar.

Fig. 6 is a perspective view of the hose-attaching section shown to the left in Fig. 1.

In the drawings, like marks of reference refer to corresponding or equivalent parts throughout the different views, in which A, represents sections of hose; B and C, hose-attaching sections; D, a rotative connecting collar; and E, a limited internally screw-threaded locking collar.

In Fig. 1 the coupling shows the hose fitted interiorly and in Fig. 2, exteriorly, the former method being used more particularly where high pressure is employed.

In the operation of our coupling, whether for inside or outside hose fittings, the methods of connecting sections are essentially the same, the main difference being the provision for fitting the rotative connecting collar D to section C. Where hose are interiorly fitted, as shown in Fig. 1, a collar D occupies a position about the section C between a rib 1 formed at the coupling end and the enlarged hose-attaching end 2, and that the collar D may be expediently attached to the section C aforesaid, the cupped portion 2 may be introduced over the end of the reduced portion 3, as at *x*, after said collar D has been placed thereon, and screw-threading the parts or by brazing or other means as may be expedient.

A packing or bushing 4 is fitted at the end of the section C within an annular groove formed between the enlarged exteriorly screw-threaded portion of the section and a concentric flange 5 upon the inner surface of said section. The arrangement of the flange 5 with the inner end of the section C is such as will permit sand or other impediment to clear the bushing 4 when the parts are released and not fall within a race or groove as is usually the case in ordinary construction. The section B where the enlarged end is exteriorly screw-threaded is also formed with a spiral groove 6 extending nearly about its surface, the same being separated by a remaining portion 15 answering as a limiting stop for a shoe or brake 16 operating from the tightening collar E fitted thereon.

The collar D is formed with oppositely-disposed lugs 11 and 12 of differing sizes, the one, as 11, being long and narrow, the other, as 12, being short and broad, the same being formed to correspondingly register with notches 13 and 14, respectively, in a depending flange 7 of the collar E, the arrangement of the lugs being between a gripping flange 10 of said collar and its opposite end, and spaced slightly farther from said flange than the breadth of the flange 7 of the collar E with which it interlocks, as will be presently described.

The arrangement of the stop 15 is to localize the turning of the collar E through the medium of the brake 16, so that when said collar is turned to the left the slots $o$ and $o'$ in the end of the section B will register with corresponding notches 13 and 14 of said collar and permit the lugs 11 and 12 of the collar D to pass behind the flange 7 of said collar and into the slots of the section B aforesaid, preventing the turning of the collar D while the collar E is being turned to the right to secure the assemblage of parts intact.

The brake 16 shown in Fig. 1 comprises a square sided device adapted to nicely fit within the groove 6 and its bottom end is arc-shaped to fit the curve of the grooved bottom, a hole corresponding in shape to its sides is formed through the collar E in which it operates. Centrally from the brake a stem 17 projects through a small hole in a disk 18 screw-threaded or otherwise tightly fitted on a ledge formed between the square hole aforesaid and an upper screw-threaded hole 19 into which a screw-tightening plug 20 is fitted. This plug is recessed at its bottom and receives the upper end of the stem 17, and is formed with a recess 21 to engage a key for turning the plug to tighten said brake upon the section B. The plug 20 is preferably fitted in one of the gripping lugs 27 of the collar E and the object of the arrangement set forth is to prevent the possibility of the coupling becoming disengaged until relieved at the hands of the operator.

In Fig. 2 a blind screw 16' is fitted to answer a similar purpose to the brake 16 of Fig. 1, and in lieu of the shoulder formed by the enlarged cupped end 2 of the section C to prevent the collar D from disengaging said section, a blind screw 2' adapted to extend with an annular groove 22 in the coupling section C is provided. The screws aforesaid may be prevented from unscrewing and becoming lost by forming a slight rim or bur about the margin of the screw holes.

The provision of the notches 13 and 14 of differing breadth and height with correspondingly-formed lugs 11 and 12, for registering therewith, and the further provision of the coupling section B having the groove 6 with limiting stop 15 permits the collar E to be turned nearly a complete revolution about said section and yet preclude the lugs 11 and 12 of the collar D from withdrawing through the slots of the collar E, this arrangement being one of the most important features of the invention, and renders the coupling fluid tight and rigid, from the fact that should the bushing 4 become reduced by wear or resilient action, the threaded connection between the coupling B and its collar E would preclude any undue looseness of the parts.

Another feature of importance in providing means to allow the collar D to be turned about the coupling C permits a coupling of the parts without turning the hose itself, a matter of no little difficulty with large and heavy hose especially when in small or inconvenient quarters.

In operation, a gasket 4 having been fitted within the section B as shown in Fig. 1, and the collar E screwed on the enlarged end of the section B to a position that will permit the shoe or brake 16 to be fitted within the groove 6 of said section, the collar E is thence turned to the left until said brake engages the limiting stop 15, an operation through the spiral action of the threads between the parts causing the flange 7 to recede or move outwardly from the end of the section B, and by which operation the slots 13 and 14 of the flange 7 will also be caused to register with the slots $o$ and $o'$ in the end of the section B.

The parts having been thus positioned, the section C together with its attached collar D is advanced into the section B and its collar E positioned so that the lugs 11 and 12 of the said collar D will register with the slots 13 and 14 of the flange 7 through which they are passed into the registering slots $o$ and $o'$ of the section B, by which operation the ribbed end 1 of the section C will abut the gasket 4 of said section, after which operation the collar E, is turned to the right, in drawing through the screw-threaded contact with the section B, the lugs 11 and 12 of the collar D, rendering the coupling rigid and water tight.

In the views, the numerals 25 indicate internally fitted hose bushing rings; 26, externally fitted hose clamping bands; and 27, lugs for operating the collar E.

From the foregoing description, taken in connection with the drawing, it is believed a more extended description will be unnecessary. Having, therefore, described the invention, what is claimed and desired to be secured by Letters Patent, is:

1. In a hose coupling having one of its hose-attaching sections provided with a circumferentially-threaded adjusting collar, said section having said threaded surface provided with a groove formed therein coincident with the pitch of its threads and extending partially about its circumference, a friction shoe or brake fitted through said collar and extending within said groove and means to regulate said brake within said groove.

2. In a hose coupling having one of its hose-attaching sections provided with a circumferentially-threaded adjusting collar, said section having said threaded surface provided with a groove therein coincident with the pitch of its threads and extending nearly about its circumference, said collar having hand gripping lugs, one of which is provided with a screw-threaded hole with a reduced square sided terminal opening through the threaded surface of said collar, a square sided brake fitted within said square hole and adapted to register with the groove in said hose-attaching section, a reduced stem extending upwardly from said brake, a collar having an aperture fitted about said stem and seated in the bottom of the screw-threaded portion of said hole, and a screw-threaded adjusting plug fitted within said screw-threaded hole and bearing on the stem of said brake, substantially as and for the purpose set forth.

3. In a hose coupling comprising two coupling sections, the entering section of which is formed with an outwardly-extending rib at its coupling end and fitted with a rotative collar having oppositely-disposed lugs, the entering end of receiving section being enlarged and receiving the said rib of the inner section and its collar and having oppositely-disposed slots, a packing between the sections, a screw-threaded collar fitted on the enlarged end of said outer section and formed with a depending flange having oppositely-disposed notches adapted to register with said slots in the enlarged end of said outer section and to receive the lugs of said collar, the arrangement of said notches with said lugs being such as will prevent the one from disengaging with the other after engagement except by the re-arranging of said parts, and means to limit the movement of one part with respect to the other.

4. In a hose coupling comprising two coupling sections, the inner section of which is formed with an outwardly-extending rib or flange at its coupling end and an enlarged hose entering connection at its opposite end and fitted with a rotative collar between said flange and said hose entering connection, said outer section being enlarged at its coupling end and receiving the rib coupling end of said inner section and its collar, a packing between the sections, a screw-threaded collar fitted on the enlarged end of said outer section having a depending flange fitting over said rotative collar, and means for interlocking said screw-threaded collar and rotative collar by the turning of said screw-threaded collar.

5. In a hose coupling comprising two coupling sections, the inner section of which is formed with an outwardly-extending flange at its coupling end and fitted with a rotative collar having oppositely-disposed lugs, one of which is longer and narrower than the other, the entering end of the outer section being enlarged and receiving the flanged coupling end of the inner section and its collar and having a groove and slot oppositely arranged to register with the lugs of said rotative collar, a packing gasket between the sections, a screw-threaded collar fitted on the enlarged end of said outer section and formed with a depending flange having oppositely-disposed notches adapted to register with the lugs of said rotative collar and the slot and groove in the entering end of said enlarged outer section, said enlarged end having a circumferential groove in its threaded surface coincident with the pitch of said threads and separated at its ends sufficient only to preclude the withdrawal of the lugs of said rotative collar through the notches in the flange of said screw-threaded collar when it is turned on its bearing, and an adjustable brake extending from said screw-threaded collar into said circumferential groove adapted to limit the rotation of said screw-threaded collar.

EDWARD G. THOMPSON.

Witnesses:
M. ESTHER LOUTIT,
N. R. FUNK.